United States Patent [19]

Hasegawa

[11] 4,177,489
[45] Dec. 4, 1979

[54] TAPE RUNNING MECHANISM PROVIDED WITH AUTOMATIC STOPPING DEVICE

[75] Inventor: Isao Hasegawa, Toda, Japan

[73] Assignee: Clarion Co. Ltd., Saitama, Japan

[21] Appl. No.: 814,616

[22] Filed: Jul. 11, 1977

[30] Foreign Application Priority Data

| Jul. 9, 1976 | [JP] | Japan | 51-80867 |
| Jul. 9, 1976 | [JP] | Japan | 51-80868 |
| Jul. 9, 1976 | [JP] | Japan | 51-90452[U] |
| Jul. 12, 1976 | [JP] | Japan | 51-91685[U] |
| Aug. 9, 1976 | [JP] | Japan | 51-93947 |
| Aug. 11, 1976 | [JP] | Japan | 51-94765 |
| Aug. 13, 1976 | [JP] | Japan | 51-107584[U] |

[51] Int. Cl.² ............... G11B 15/18; G11B 21/22
[52] U.S. Cl. ............... 360/74.2; 242/191; 360/96.5; 360/105
[58] Field of Search ........... 360/74, 105, 96; 242/191

[56] References Cited

U.S. PATENT DOCUMENTS

| 3,915,408 | 10/1975 | Ishikawa | 242/191 |
| 3,955,776 | 5/1976 | Komatsu et al. | 242/191 |
| 3,971,528 | 7/1976 | Komatsu et al. | 242/191 |

Primary Examiner—Robert S. Tupper
Attorney, Agent, or Firm—William Anthony Drucker

[57] ABSTRACT

The automatic stopping device for use in a tape recorder comprises a detection arm mechanically operated in response to stopping of the rotation of a reel driving shaft. A flywheel connected to a capstan is provided with a plurality of projections arranged about the capstan to be engaged by a latch member. A push lever is pivotally connected to the latch member and a stationary deck. The push lever and the detection lever are interconnected by a connecting lever and a spring through slot means.

22 Claims, 9 Drawing Figures

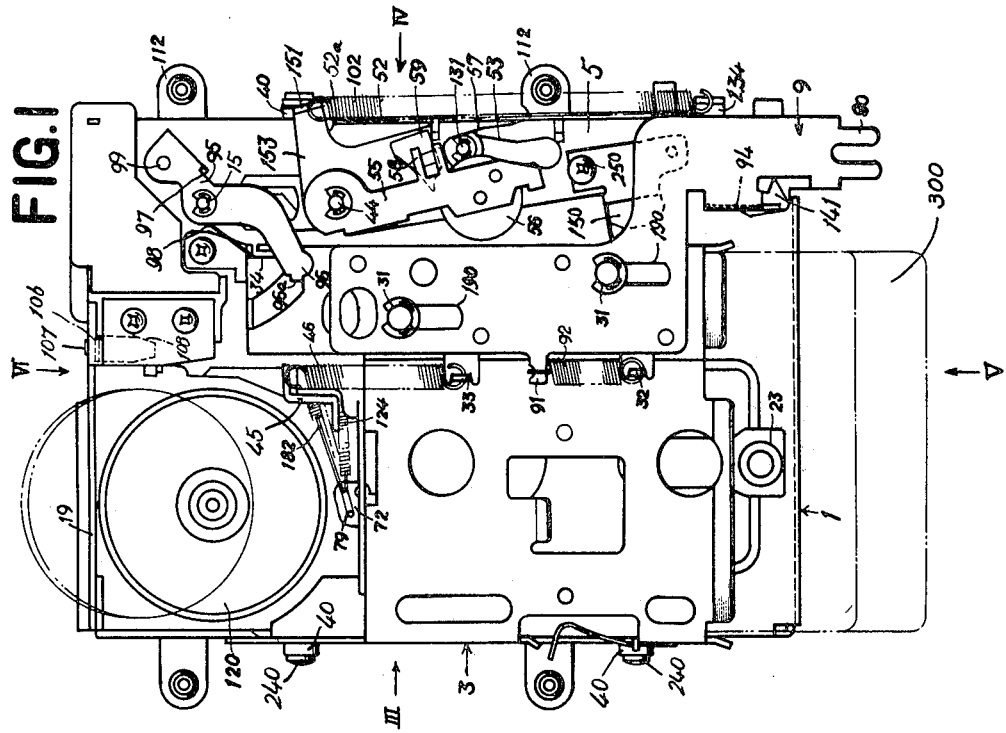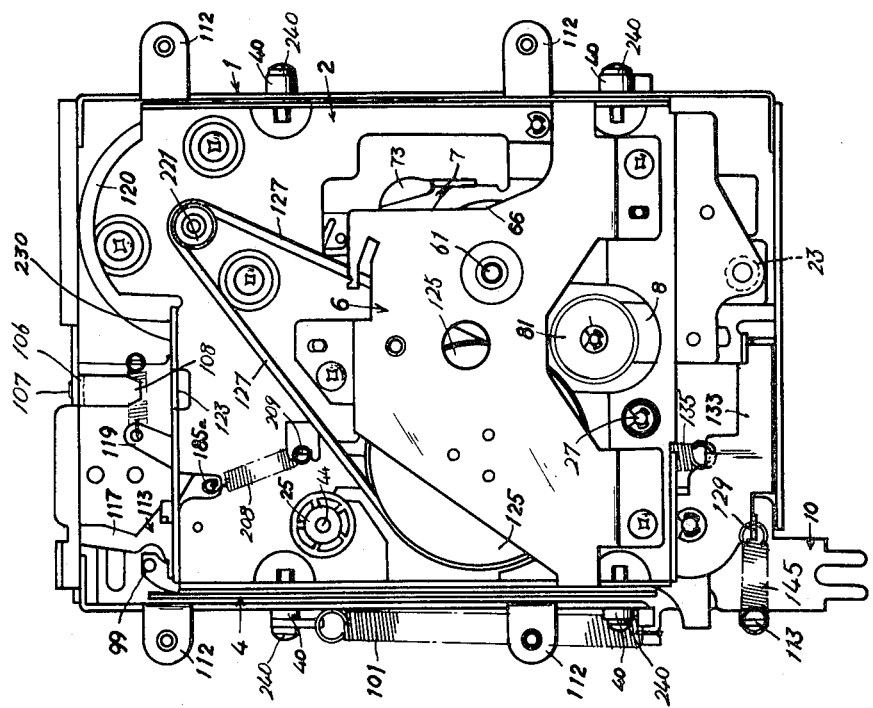

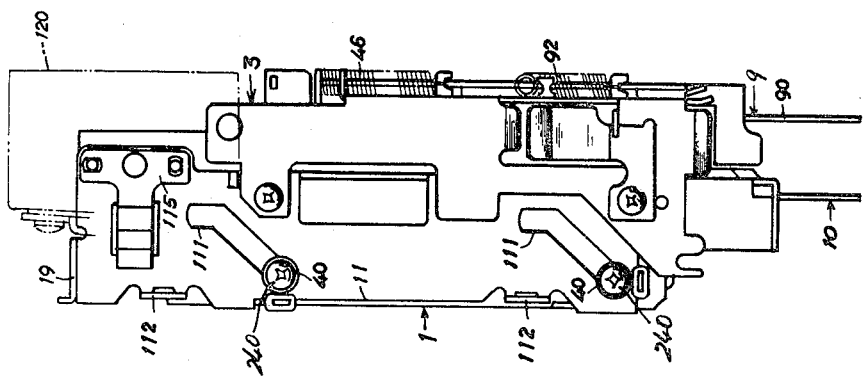
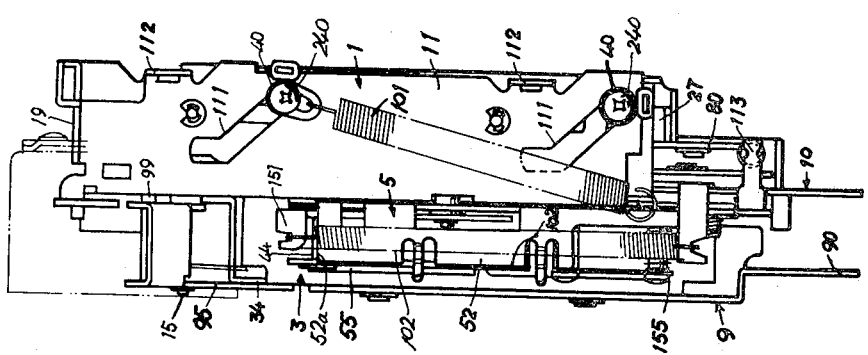
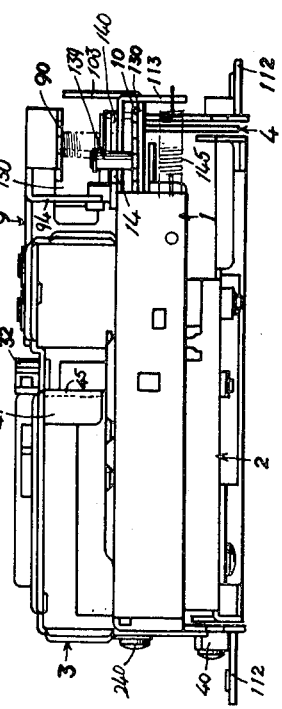

TAPE RUNNING MECHANISM PROVIDED WITH AUTOMATIC STOPPING DEVICE

BACKGROUND OF THE INVENTION

This invention relates to a tape running apparatus for use in a tape recorder or the like, more particularly an automatic tape apparatus for stopping the tape under abnormal conditions.

In a tape recorder, it is necessary to stop the running of the tape when the end of the tape is reached or under such abnormal conditions as bulging out or tangling of the tape in order to assure correct operation and to prevent damage or breakage of the tape as well as fault of the mechanical portions. Although various electrical and mechanical quick stopping devices have been used they are not always satisfactory. For example, according to an electrical stopping device, disclosed in U.S. Pat. No. 3,488,019, the rotation of a reel driving member is electrically detected for a actuating tape stopping device so that when the reel driving member is caused to rotate in the reverse direction due to tangling of the tape it would be impossible to produce a stopping signal with the result that the tangling becomes more severe. On the other hand, since in a mechanical stopping device, the abnormal condition is detected by the abnormal tension of the tape it is impossible to detect such an abnormal condition as bulging which does not cause any abnormal tension of the tape. Moreover, as the abnormal condition is detected on the assumption that the tape runs at a constant speed it is impossible to detect the abnormal condition and to stop the tape under a high speed tape running condition which is several times greater than the recording or reproducing speed. For this reason, it is impossible to use a sufficiently high running speed as desired. As above described since detection of the end of the tape is difficult under the high speed running condition when the tape is locked under high speed running condition, it is impossible to unlock the tape by detecting the tape end so that it is necessary to effect the high speed running by manually depressing a button. Moreover, it is necessary to repeat several times the stopping and the starting of the high speed running when the tape end is reached. In the prior art automatic stopping device, it is liable to be held at the stopped state after the tape has stopped so that restarting of the tape can not be made smoothly.

SUMMARY OF THE INVENTION

It is an object of this invention to provide a tape running mechanism provided with an automatic stopping device which stops the running of the tape in response to such abnormal conditions of the tape as the arrival of the tape end and, bulging out and tangling of the tape, said stopping device being also effective at the time of high speed running and permitting smooth restarting of the tape.

Another object of this invention is to provide an improved stopping device especially suitable for a tape recorder wherein a magnetic tape is run between a pair of reels and the tape is run at a normal speed and at a higher speed.

Still another object of this invention is to provide an improved tape running mechanism including a high speed running locking mechanism and an abnormal tape condition detecting device which not only stops the running of the tape upon occurrence of an abnormal condition but also releases the high speed running locking mechanism.

Yet another object of this invention is to provide a tape running mechanism including means for switching the running speed of the tape between normal speed and high speed.

A further object of this invention is to provide means for holding an elevating platform at the raised position.

A still further object of this invention is to provide an improved tape running mechanism of the type wherein a cassette type tape pack is loaded on a reel drive shaft by using an elevating platform, and wherein a pinch roller and a head are moved to their operative position in response to the loading of the tape pack.

Another object of this invention is to provide a simple and compact means for releasing the tape high speed running condition and carrying out ejection by a single operation.

According to one aspect of this invention there is provided a tape running mechanism provided with an automatic stopping device comprising a detection arm mechanically operated in response to stopping of the rotation of a reel driving shaft, a flywheel provided with a capstan, a latch member cooperating with the flywheel, a push member pivotally connected to the latch member and to a stationary deck, and a connecting lever and a spring which interconnect the push member and the detection arm through slot means, and a plurality of members disposed on the flywheel about the capstan for engaging the latch member.

According to another aspect of this invention there is provided a tape running mechanism provided with an automatic stopping device comprising a detection arm mechanically operated in response to the stopping of the rotation of a reel driving shaft, a flywheel provided with a capstan, a latch member cooperating with the flywheel, the latch member being mounted on a stationary deck to be movable in the vertical direction, a push member mounted on an elevating platform and pivotally connected to the latch member, a connecting lever and a spring which interconnect the latch member and the detection arm through slot means, a plurality of members mounted on the flywheel about the capstan for engaging the latch member, a head plate movably mounted on the stationary deck, means for moving the head plate in response to the movement of the elevating platform, a high speed running locking member pivotally mounted on the stationary deck, means for holding the locking member in an inoperative condition when the head plate is moved to an inoperative position in response to the movement of the elevating platform, a locking plate for holding the high speed running locking member in an operative position, and a projection of the push member which is arranged to engage the locking plate so that when the push member detects a tape running condition the push member releases the high speed running locking member.

According to still another aspect of this invention, there is provided a tape running mechanism provided with an automatic stopping mechanism comprising a detection arm mechanically operated in response to the stopping of the rotation of a reel driving shaft, a flywheel provided with a capstan, a latch member cooperating with the flywheel, the latch member being mounted on a stationary deck to be movable in the vertical direction, a sliding frame mounted on an elevating platform to be moved by a tape pack loaded in a guide frame provided for the stationary deck, a superposed pinch roller supporting frame and a head plate mounting plate which are pivotally mounted on the sliding frame by the same pivot pin, the head mounting plate being provided with a cam slot and the pinch roller supporting frame being formed with a cam surface, a roller engaging the cam slot and the cam surface for operating the pinch roller supporting frame and the head mounting frame, means for interconnecting the head mounting plate and the pinch roller supporting frame, a spring for urging a head supported by the head mounting plate and a pinch roller supported by the pinch roller supporting frame against a tape, a push member mounted on the elevating platform and pivotally connected to the latch member, a connecting lever and a spring which interconnect the push member and the detection arm through slot means, and a plurality of members mounted on the flywheel about the capstan to be engaged by the latch member.

According to a further aspect of this invention there is provided an automatic stopping mechanism comprising a detection arm mechanically operated in response to the stopping of the rotation of a reel driving shaft, a flywheel provided with a capstan, a latch member cooperating with the flywheel, a push member pivotally connected to the latch member and to a stationary deck, a connecting rod and a spring which interconnect the push member and the detection arm through slot means, a plurality of projecting members mounted on the flywheel about the capstan to be engaged by the latch member, a rotation transmission member provided for the reel driving shaft for transmitting thereto the rotation of a driving motor, a first driven member coupled to the rotation transmission member through a first friction member, and a second driven member coupled to the first driven member through a second friction member and connected to the reel driving shaft, the second driven member being provided with a member to be engaged by the detection cam when it is rotated in the direction of rotation of the rotation transmission member, said rotation transmission member being provided with a cam for rotating the detection arm in a direction opposite to the direction of rotation of the first driven member and a projection for moving the detection arm in a direction at an angle with respect to the direction of rotation of the first driven member, thereby stopping the driving motor.

BRIEF DESCRIPTION OF THE DRAWINGS

Further objects and advantages as well as the practical construction of the invention will be more fully understood from the following detailed description taken in conjunction with the accompanying drawings in which:

FIG. 1 is a plan view of a tape recorder incorporating a tape stopping apparatus of this invention;

FIG. 2 is a bottom plan view of the tape recorder shown in FIG. 1;

FIG. 3 is a lefthand side view of the tape recorder shown in FIG. 1;

FIG. 4 is a righthand side view;

FIG. 5 is a bottom side view;

FIG. 6 is a top side view, of the tape recorder shown in FIG. 1.

DESCRIPTION OF THE PREFERRED EMBODIMENT

Figure 7:
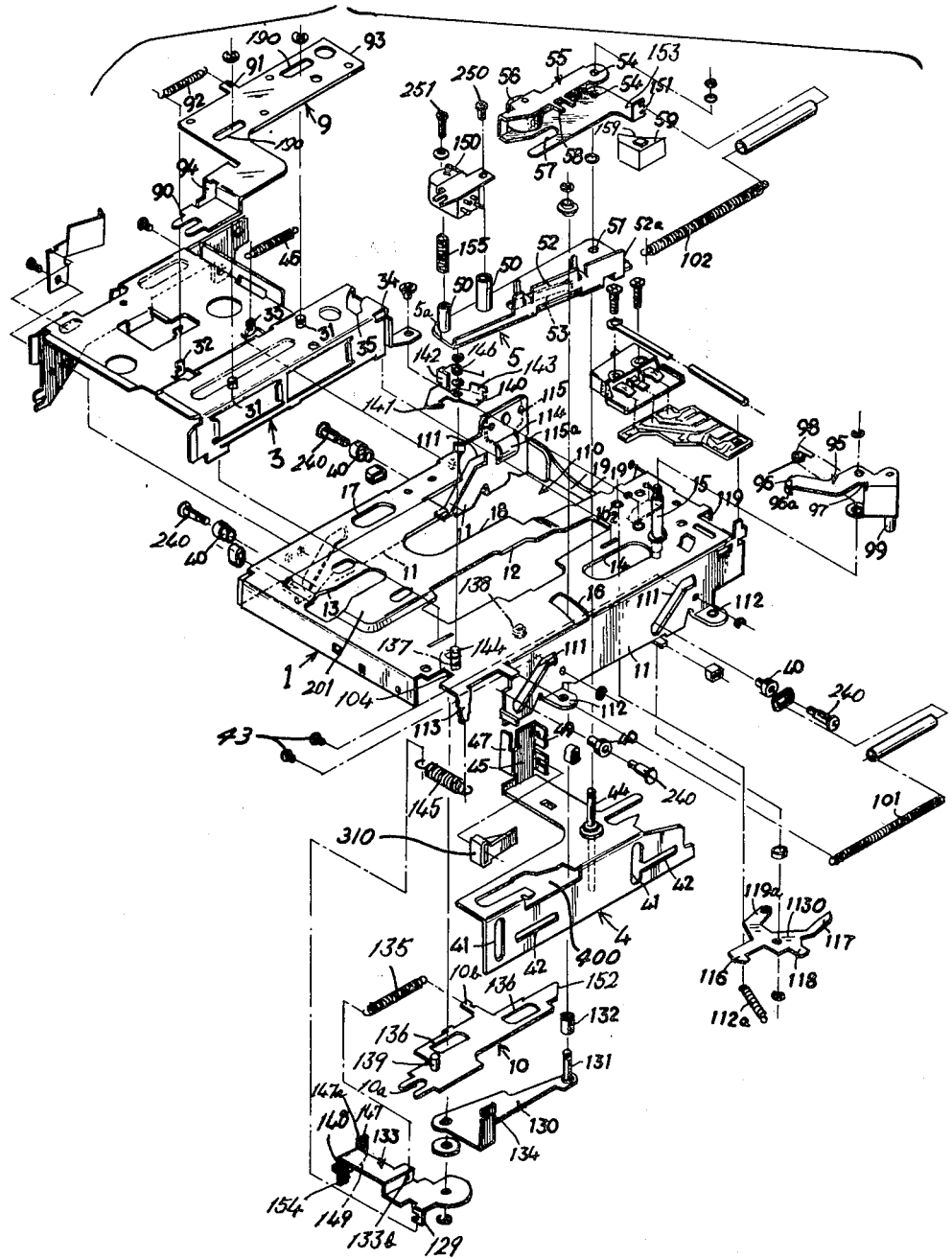
FIG. 7 is an exploded perspective view showing various component elements of the tape recorder.

Referring now to the accompanying drawings, more particularly FIG. 7, a stationary deck 1 is provided with an opening 12 for passing a capstan, an opening 18 for passing a reel driving member, an opening 13 for receiving an engaging member, an opening 14 for inserting a main shaft, an opening 16 for inserting a shaft 131, and an opening 17 for receiving a pin 1400. A rear plate 19 provided with a recess 19a is secured to the rear side of the deck board for defining a region 110 for mounting a driving motor.

Figure 8:
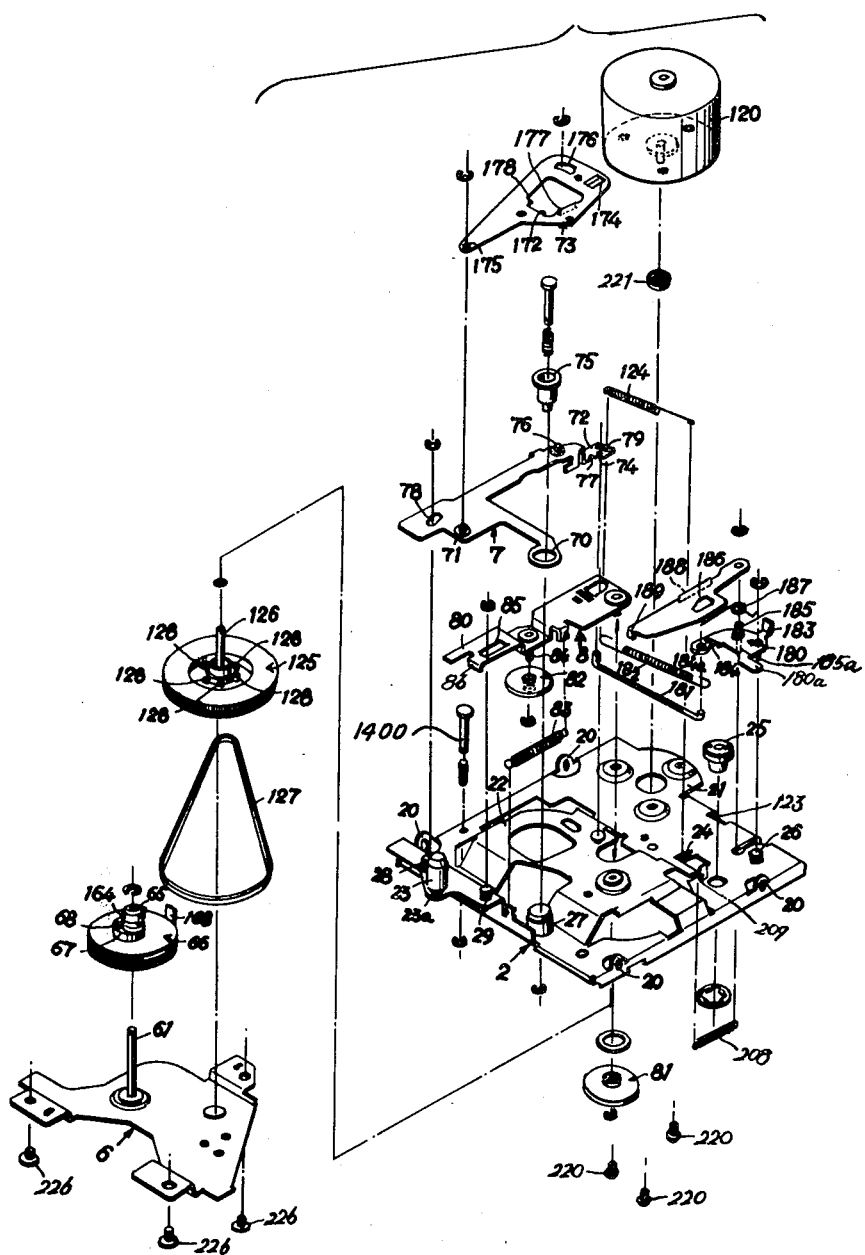
FIG. 8 is an exploded perspective view showing the elevating platform and the elements associated therewith.

An elevating platform 2 shown in FIG. 8 is movably secured to the bottom of the stationary deck 1. A guide frame 3 is mounted on the stationary deck so that a cassette 300 is loaded into the space between the deck 1 and the frame 3. Both end walls of the deck 1 are bent downwardly as at 11 and a sliding frame 4 is provided to slide along the inner side of the fore end wall 11. Each end wall 11 is provided with a pair of inclined guide slots 111 near both ends thereof for receiving guide members 40 secured to the elevating platform 2. The guide members 40 also fit in vertical guide grooves 41 near both ends of the sliding frame 4 to guide the same. The sliding frame 4 is provided with horizontal guide grooves 42 in a direction perpendicular to the vertical guide grooves 41 for receiving guide members 43 mounted on the end wall 11 of the stationary deck 1, thereby guiding the sliding frame 4 in the horizontal direction.

A head plate 5 shown in the upper portion of FIG. 7 is mounted on one side portion of the deck 1 not covered by the guide frame 39 and a pinch roller supporting frame 55 is superposed on the head plate 5. The assembly of the head plate 5 and the pinch roller supporting frame 55 is mounted on the stationary deck 1 and a vertical main shaft 44 secured to the sliding frame 4 extends through openings 51 and 54 at one end of the head plate and the pinch roller supporting frame respectively, the portion of the main shaft 44 extending below the sliding frame 4 being received by a guide member 25 at one end of the elevating platform 2 for guiding the vertical movement thereof. Internally threaded supports 50 are secured near the lefthand side of the head plate 5 and a pickup head 150 is secured to the supports 50 by screws 250 and 251 through a spring 155 so as to adjust the azimuth and height of the pickup head. One side of the head plate 5 is bent up as at 52 to face a pinch roller 56 with a suitable spacing therebetween. The lead wires, not shown, to the pickup head 150 are clamped to the upper edge of the bent up side wall 52 leaving a sufficient height on the remaining side wall for passing the tape. The head plate is also provided with a guide groove 53 for receiving a roller 132 carried by the pin 131 at one end of a slide arm 130 to be described later. The roller 132 is also received in a slot 57 formed at one end of the base of the frame 55 which supports the pinch roller 56. At about the center of the upper plate of the frame 55 there is provided a slot 58 for receiving a tape guide 59 made of a synthetic resin and functioning to guide the tape and to prevent tangling thereof.

A spring 102 is connected between an upward projection 134 of the slide arm 130 and an anchor 151 formed on the pinch roller frame 55. Elasticity of said spring 102 is applied to both the pinch roller frame 55 and the head 150.

The tape guide 59 is provided with a suitably curved guide surface 159 for guiding a portion of the tape which is forced out of the pinch roller 56 toward the outside of the stationary deck with respect to the main shaft 44 by utilizing a space between the guide surface and the side wall 52 thus storing the tape at this portion. The tape guided in this manner is then returned to the tape pack via said guide surface 159. In this example, the side wall 52 of the head plate 5 is assembled to extend along the pinch roller frame 55. However, such side wall may be provided for the pinch roller frame. Furthermore instead of connecting one end of the spring 102 to the head plate 5, it may be connected to the stationary deck 1 or to the casing containing the same.

The spring anchor 151 is formed on an arm 153 at one end of the pinch roller frame 55, the arm 153 extending to the outside of the bent up side wall 52 of the head plate 5 so as to engage the side edge 52a of the side wall 52 in the assembled condition shown in FIG. 1 in which the pinch roller plate 55 is mounted on the head plate 5.

The force of spring 102 acting upon the arm 153 urges the pinch roller frame 55 and the head plate 5 to rotate in the clockwise direction about the main shaft 44. This biasing force is controlled by the roller 132.

The guide members 40 are secured to opposing seats 20 which are provided for both sides of the elevating deck 2. Each guide member 40 extends through the guide groove 111 on both sides of the stationary deck 1 and the vertical guide groove 41 of the sliding frame 4 for guiding the movement of the elevating platform 2 and the sliding movement of the sliding frame 4. A driving motor 120 is secured to a portion 21 of the elevating platform 2 by means of a screw 220. A raised portion 22 is formed at the central portion of the elevating deck 2 for mounting and driven members (to be described later) on its lower surface. A bottom plate 6 is secured to the lower surface of the raised portion 22 by means of screws 226 for defining a compartment for accommodating the driving and driven members including a flywheel 125 provided with a capstan 126, a rotary driving member 66 provided with a reel driving member 65 for supporting a take up reel (not shown), and intermediate rotary members 81 and 82. The flywheel 125 is driven by a pulley 221 rotated by the motor 120 through a belt 127. The intermediate rotary members 81 and 82 mounted on an idler plate 8 are switched by depressing an operating member 80 of the idler plate 8. More particularly, under normal condition, by the tension of a tension spring 83 connected between the idler plate 8 and the elevating platform 2, the intermediate rotary member 81 having a relatively large diameter is interposed between the rotary members 125 and 66 for running the tape at a speed suitable for normal recording or reproducing. However, when the idler plate 8 is depressed at the operating end 80 thereof against the force of the spring 83, an idler gear 82 mounted on a shaft 84 is interposed between the rotary members 125 and 66 thereby enabling high speed running of the tape. A pin 23 having a reduced diameter portion 23a at the lower end is mounted on the elevating platform 2. The pin 23 as well as the reel driving member 65 are used to receive a reel of a well known cassette tape pack. Another pin 27 is mounted on the elevating platform 2 on the same side as the pin 23 for pivotally mounting one end 70 of an interlocking arm 7 by means of a fixture 75. Guide members 28 and 29 are secured on both sides of the pin 23, the former being received in a notch 78 at one end of the interlocking arm 7 while the latter in a slot 85 of the idler plate 8.

Guide pins 31 are secured to the upper surface of the guide frame 3 shown in FIG. 7 to be slidably received in slots 190 of an ejection lever 9 provided with a member 90 for mounting an operating button, not shown. A tension spring 92 is connected between a lug 91 of the ejecting lever 9 and a lug 32 of the guide frame 3 whereas a tension spring 46 is connected between another lug 33 of the guide frame 3 and a lug 48 of the connecting member 45 at the front end of the sliding frame 4 as shown in FIG. 1. The sliding frame 4 is pushed forwardly when a cassette is loaded in the guide frame 3 to actuate the elevating platform 2. To this end the vertical connecting member 45 is provided with an engaging surface 47.

The rear edge 93 of the ejecting lever 9 is adapted to engage the front end 96 of an ejecting link 95 shown in FIG. 7. The ejecting link 95 is pivotally mounted on the pivot shaft 15 on the stationary deck 1, and a spring 98 surrounding the pivot shaft 15 is connected between a lug 34 of the guide frame 3 and a lug 97 of the link 95 for normally biasing the same in the counterclockwise direction as viewed in FIG. 1. A downwardly bent projection 96a at the front end 96 of the link 95 engages a notch 35 of the guide frame 3 for holding the front end 96 at a position opposing the rear edge 93. When the ejecting lever 9 is pushed toward right, the ejecting link 95 is rotated about pivot shaft to push a projection 118 of a locking plate 1130 by a pin 99 mounted on the link 95 for releasing the locking of the main shaft 44 in its advanced position with a projection 116 of plate 1130 thereby ejecting the loaded cassette. A spring 101 is connected between the stationary deck 1 and one of the guide members 40 for urging the elevating platform 2 to its lowered position, and a tension spring 102 is connected between a lug 151 on the pinch roller supporting frame 55 and a lug 134 for urging the pinchroller and the head towards their operating positions.

There is provided a high speed running control member 10 having a recess 10a at one end for mounting an operating button. The control member is provided with slots 136 adapted to receive guide pins 137 and 138 secured to the bottom of the stationary deck 1. A rotatable arm 130 and a high speed running arm 133 are mounted on the pin 137 on the lower side of the deck. A high speed running locking plate 140 is pivotally mounted on the upper surface of the stationary deck 1 by means of a pivot pin 144. The pivot shaft 15 extending through the stationary deck 1 pivotally supports the center of a locking plate 1130 on the lower side of the deck 1. The locking plate 113 is provided with four arms 116, 117, 118 and 119a. The arm 116 is adapted to engage the main shaft 44 to hold the sliding frame 11 in its advanced position when it is moved by the loaded cassette. The arm 117 is adapted to engage a stop 119 at the rear edge of the stationary deck 1 and operated by the operating member 183 of the push member 180 to be described later. The arm 119a is connected to the hole 162 of the stationary deck 1 through a spring 112a to urge said plate 1130 in the counterclockwise direction. The remaining arm 118 cooperates with the projection 99 of the ejecting link 95 for unlocking the locking member 116 from the main shaft 44 when said link 95 is rotated by the ejecting lever 9.

The high speed running control lever 10 is provided with a pin 139 adapted to cooperate with a locking member 141 formed at one end of the high speed running locking plate 140. The pin 139 is received in a notch 104 on the lefthand side of the stationary deck 1 for co-operating the locking member 141, as shown in FIG. 5. A spring 135 is connected between a lug 10b of the control lever 10 and an opening 133b at an intermediate point of the high speed running lever 133. A tension spring 145 is connected between a lug 129 of the lever 133 and a lug 113 depending from one side of the stationary deck 1. A bent up portion 142 is provided on one side of the high speed running locking plate 140 for engaging an operating member 94 formed by downwardly bending one edge of the ejection lever 9. A bent up edge 143 of the locking plate 140 is adapted to engage the lefthand edge 5a of the head plate 5 for limiting the counterclockwise rotation of the locking plate 140 caused by the spring 146 at the time of ejection thereby retracting its locking member 141 from the path of the pin 139. A spring 102 is connected between a lug 134 at one end of the sliding arm 130 and the pinch roller frame 55. The high speed running control arm 133 is provided with a downward projection 148 having an arcuate edge 149, and a upright projection 147 adapted to engage a projection 86 at the lefthand end of the idler plate 8. When a tape pack is loaded and the elevating platform 2 is raised, depression of the high speed running control lever 10 results in the rotation of the control arm 133 through spring 135. Accordingly, the projection 147 engages the projection 86 of the idler plate 8 for establishing the high speed running condition by interposing the intermediate rotary member 82. When the control lever 10 is fully advanced, the pin 139 is locked by the locking member 141 thus maintaining the high speed running condition. Under this condition, the member 142 of the locking plate 140 is brought to face the operating member 94 of the ejecting member 9 so that when the ejecting member 9 is depressed, the high speed locking plate 140 will be rotated in the clockwise direction about shaft 144 for disengaging the locking member 141 from the pin 139 thus releasing the high speed running condition. As the ejecting member 9 is further depressed, its righthand edge 93 engages the ejection link 95 thereby ejecting the tape pack as above-described to rotate it in the clockwise direction.

The sliding arm 130 is normally biased to rotate in the counterclockwise direction by the spring 102 thus urging the roller 132 on the righthand end of the sliding arm 130 against the lefthand end of the slot 16 of the stationary deck. As the high speed running control lever 10 is advanced, the inclined surface 152 at one end thereof engages the roller 132 to rotate the sliding arm in the clockwise direction and the roller extending through the groove 53 rotates the head plate 5 in the counterclockwise direction thus causing the head 150 and the pinch roller 56 to disengage the tape. The upper edge 147a of the projection 147 of the arm 133 engages the bottom surface of a slightly raised portion 201 of the stationary deck 1 whereas the arcuate edge 149 guides the downwardly bent member 86 of the idler plate 8 secured to the elevating platform 2 when it is lowered to the inoperative position until the member 86 is stopped by the stop 154 of the arm 133.

As shown in FIGS. 1, 2 and 6, a L shaped leaf spring 106 made of phosphor bronze, for example, is secured to the rear plate 19 by means of a screw 107. The free end 108 of the leaf spring 106 is bent toward the inner side of the stationary deck 1. A downward bending portion 1230 is provided at the rear edge of the elevating platform 2. A slot 123 is provided at said bending portion so as to receive the free end 108 of the leaf spring 106 when the elevating platform 2 is raised and forwarded by the sliding frame through guide members 40 and grooves 111 when the cassette is inserted.

The engagement of the leaf spring 106 with the notch 123 is released when the elevating platform 2 returns to its lower position.

As described above, when the elevating platform 2 is raised to the reproducing position, the leaf spring engages the slot 123 so as to firmly hold the platform 2 at the reproducing position against vibration or shock. Engagement between the leaf spring and the slot also establishes an electrical circuit extending through the deck 1 and the platform 2.

Figure 9:
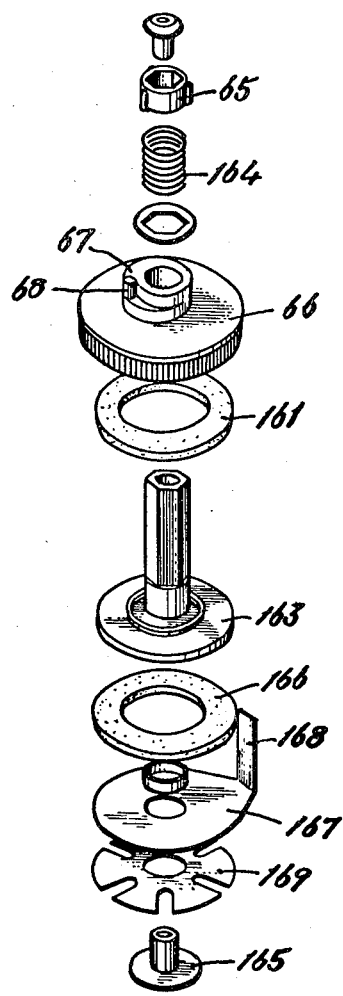
FIG. 9 is an exploded perspective view showing driving and driven members.

As shown in FIG. 8, the flywheel 125 is provided with a plurality of pins or projections 128 about capstan 126. The rotary driving member 66 mounted on the shaft 61 secured to the bottom plate 6 is provided with an eccentric cam 67 integral with the reel driving member 65 and the eccentric cam 67 is provided with a projection 68 on its upper surface. As shown by the exploded view FIG. 9, beneath the rotary driving member 66 is provided a motion transmission disc 163 which is secured to the reel driving member 65 through a polygonal opening. A friction disc 161 is interposed between the disc 163 and the rotary driving member 66 so as to rotate them as an integral unit. A spring 164 is interposed between the lower end of the reel driving member 65 and the rotary driving member 66. A driven member 167 is coupled to the motion transmission disc 163 through another friction disc 166 and urged to by a securing member 165 through a spring plate 169. An upward projection 168 of said driven member 167 extends in parallel with the reel driving member 65 along one side of the rotary driving member 66. The spring 164 functions to ensure the frictional engagement between the friction discs 161 and 166 and cooperating members. However, the materials of these members are to be selected such that the frictional coupling force between the friction disc 166 and the driven member 167 is much smaller than that between the friction disc 161 and the driving member 66. For example it is advantageous to construct the driving member 66 with a synthetic resin and the driven member 167 with metal. Alternatively, the surface of the friction disc 166 in contact with the driven member 167 may be coated with a friction decreasing coating for decreasing the frictional force so that the friction may be overcome by slight resistance.

An opening 174 of the detection plate 73 which is pivotally mounted on the interlocking arm 7 at a point 71 suitably spaced from its pivoted end 70 receives the projection 168 of the driven member 167. At the central portion of the detection plate 73 is formed an opening 172 having a size sufficient to accommodate the reel driving member 65 and the eccentric cam 67 mounted on the driving member 66. One side 177 of the opening 172 is adapted to engage the eccentric cam 67 and the opposite side is formed with a shoulder 178 that engages a projection 68 on the eccentric cam 67. On the righthand side of the detection plate 73 is formed an arcuate slot 176 having the same center as the opening 175 for pivotally mounting the detection plate 73. The slot 176 receives a pin 76 near the righthand end of the interlocking arm 7.

The connecting member 72 at the free end of the interlocking arm 7 is provided with openings 74 and 79.

A spring 208 is connected between a lug 209 on the elevating platform 2 and a pin 185a on a push member 180 which is pivotally mounted on the elevating platform by a pivot pin 26. The push member 180 is connected to the opening 79 through a connecting rod 181. A spring 182 is connected between the opening 74 of the interlocking arm 7 and an opening 184 of the push member 180, which extends in parallel with a latch member 186. Another spring 124 is provided between the connecting member 72 and a lug 24 of the elevating platform 2 for normally biasing the detection arm 7 in the clockwise direction. The springs 182 and 124 may be connected to either one of the openings 74 and 79 depending upon their relative strength. It is advantageous to suitably construct the connecting member 72 so as to correct its manufacturing error. For example, a narrow neck 77 may be provided for the connecting member 72 so that it can be adjusted by bending it at the narrow neck 77.

To stop the flywheel 125 by the push member 180, a pivot pin 185 is provided for the push member 180 for pivotally supporting one end of the operating member 186. A spring 187 surrounding the pivot pin 185 is interposed between the projection 183 of the push member 180 and a lug 188 of the latch member 186 for urging the same in the clockwise direction. At one end of the latch member 186 is provided a depending projection 189 for engaging one of the pins 128 of the flywheel 125. The projection 183 of the push member 180 is bent upwardly so as to cooperate with the arm 117 of the locking plate 113 mounted on the lower side of the stationary deck 1 thereby releasing the locking of the main shaft 44 in its advanced position. The portion 184 of the push member 180 including opening 184a for connecting the connecting member 181 and spring 182 is slightly curved upwardly so that when this portion is rotated in the counter clockwise direction by spring 187 it will engage the outer surface of lug 188 to act as a stop member.

When the rotary driving member 66 is rotated by the driving motor 120, the reel driving member 65 is driven to wind a tape, as known in prior arts. According to this invention, a driven member 167 coupled to the driving member 65 through the other friction disc 166 and a detection plate 73 rotated in the direction of rotation of the driving member 65 are disposed to cooperate with each other. In addition, since eccentric cam 67 is provided for the detecting plate 73 to rotate in the opposite direction of the rotation imparted thereto from the driven member 167 and since there is also provided a projection 68 which drives the detection plate 73 in a direction which crosses the direction of rotation thereof caused by the driven member 167, during the take up operation of the tape, the detection plate 73 will not be operated by the driven member 167 so long as the driven member 65 continues to rotate. When the end of the tape is reached, the running of the tape is terminated. When the tape bulges outwardly, the rotation of the reel driving member is stopped. Accordingly, the driven member 167 is also stopped so that the driving power for driving the detection arm 73 in the same direction as the driving member 66 disappears. As a consequence, the rotation of only the driving member 66 is continued and the detection arm 73 is stopped at a position rotated by the cam 67 in the direction opposite to the direction of rotation of the driving member 66. When the rotation of the driving member 66 is continued under these conditions, the projection 68 of the cam 67 engages the shoulder 178 of the detection arm 73 for rotating the same in a direction perpendicular to the direction of rotation of the driven member 167 thereby actuating the detection arm 7. In the case of tangling of the tape, the reel driving member is rotated in the opposite direction by the removal of the tangled portion of the tape so that the driven member 167 will not act upon the detection arm 73 as in the normal rotation, thus actuating the detection arm 7.

As described above, a plurality of pins 128 for engaging the latch member 186 are provided for the flywheel about the capstan and it is possible to accurately stop the rotation of the flywheel in response to the mechanical detection of the stopping of the take up reel. More particularly, not only during the normal tape take up operation at the time of reproducing, but also during the high speed running operation, one of the pins 128 accurately engages the latch member 186 thereby assuring automatic stopping of the tape recorder. For this reason, even when a locking device for the high speed running is used, it is possible to release the locking device by the detection operation described above. This enables the use of the locking device for much larger high speed running than was possible with the prior art device. Moreover, as the detection arm and the latch member are linked through a connecting lever and a spring, and since the latch member is pivotally connected between the pivotal point of the push member to the stationary deck and the connecting point of the connecting rod and the spring, when the detection arm is moved, the push member is moved near the pins of the flywheel against the force of the spring and then strongly moved by the connecting lever 181 whereby the push member is instantly and accurately engaged with one of the pins 128. This prevents erroneous operation caused by manufacturing errors or slight movements. When the flywheel begins to rotate, the latch member 186 is caused to disengage the pins 128 for releasing the detection arm and other members from the stop position whereby smooth starting of the tape can be assured. The locking member for the high speed running is released by the movement of the push member. As above described, not only abnormal conditions at the time of high speed running can be accurately detected but also the restarting of the high speed running can be made readily.

What is claimed is:
1. In a magnetic tape recorder having:
(a) a reel driving shaft (61) and
(b) a driving motor (120), an automatic stopping device comprising:
(i) a detection arm (7) mounted for pivoting about an axis parallel to the axis of said reel driving shaft,
(ii) means acting on said detection arm (7) for mechanically operating said arm (7) in response to the stopping of rotation of said reel driving shaft (61)
(iii) a push member (180) mounted for rotation about an axis parallel to the axis of the reel driving shaft (61)
(iv) a connecting lever (181) interconnecting said detection arm (7) and said push member (180) such that push member (180) is caused to move when said detection arm (7) moves
(v) a latch member (186) mounted for rotation about an axis parallel to the axis of the reel driving shaft (61) and including an engaging member (189) at an end thereof,
(vi) spring means acting between the push member (180) and the latch member (186) to urge the latch member (186) to rotate when said push member (180) is rotated, (vii) a flywheel (125) coupled to said driving motor (120) for rotation by said motor, (viii) a plurality of members (128) provided on said flywheel (125) and positioned to be abutted by said engaging member (189), and thereby prevent further rotation of the flywheel (125), when said latch member (186) is moved by said spring means as a result of movement of said push member (180) by said detection arm (7) detecting stoppage of rotation of said reel driving shaft (61).

2. The mechanism according to claim 1 which further comprises:

a rotation transmission member connected to said reel driving shaft for transmitting thereto the rotation of the driving motor, said rotation transmission member being provided with an eccentric cam and a projection, a first driven member coupled to said rotation transmission member by a first friction member and connected to said reel driving shaft, a second driven member coupled to said first driven member by a second friction member and connected to said reel driving shaft, said second driven member being provided with a projection, a detection plate connected to said detection arm, said plate being provided with an opening for loosely accommodating said eccentric cam, one side of said opening being adapted to engage said eccentric cam to be urged in a direction opposite to the direction of said rotation transmission member and the other side of said opening being provided with a shoulder adapted to engage said projection to be moved in a direction at an angle with respect to the direction of the rotation of said transmission member, said plate being further provided with a slot for receiving said projection to be urged in a direction of the rotation of the rotation transmission member, thereby operating said detection arm in response to the stopping of the rotation of the reel driving shaft.

3. The tape running mechanism according to claim 2 which further comprises spring means for coupling said rotation transmitting means with said second driven member through said friction members.

4. The tape running mechanism according to claim 2 which further comprises securing means for securely coupling the motion transmission disc to the driven member through the friction disc.

5. The mechanism according to claim 2 wherein said detection plate is provided with an arcuate guide opening near said one end having a center at the pivot axis of said detection plate, and said detection arm is provided with a projection received in said guide opening.

6. The mechanism according to claim 1 wherein said detection arm is provided with a connection member at the free end thereof, said connection member is provided with juxtaposed circular opening and a slot one end of said connecting lever is received in said slot and the other end is connected to the push member pivotally mounted on said deck, and said circular opening and said push member are interconnected by said tension spring, thus interconnecting said push member and said detection arm.

7. The mechanism according to claim 1 wherein a spring is connected between said latch member and said push member for urging the latch member to rotate.

8. The mechanism according to claim 1 wherein said head mounting plate is provided with a side wall spaced from said pinch roller thereby forming therebetween a space for accumulating the tape.

9. The mechanism according to claim 8 wherein the pinch roller is rotatably mounted on the intermediate portion of said pinch roller supporting frame, a tape guide is mounted above said intermediate portion for guiding the tape passing through said pinch roller, and said tape guide is provided with a curved guide surface for guiding the tape toward said guide wall and into the tape pack.

10. The mechanism according to claim 1 which further comprises:

an elevating platform movable in a vertical direction with respect to the stationary deck, a sliding frame mounted on said elevating platform which slides in a horizontal direction with respect to the stationary deck, said sliding frame and said elevating platform being moved to their operating positions by the loaded tape pack, and a locking plate pivotally mounted on a stationary deck for locking said sliding frame in an operating position and wherein said push member actuates said locking plate so as to release the locking condition of said sliding frame in response to the movement of said detection arm, thereby ejecting the loaded tape pack.

11. The mechanism according to claim 10 wherein the said sliding frame is provided with a main shaft, said locking plate is provided with a projection for engaging said shaft to lock the sliding frame in the operating position, and said push member is provided with a projection arranged to engage another projection of said locking plate for releasing the engagement of said projection and the shaft.

12. The mechanism according to claim 10 wherein said sliding frame is provided with a switching member connecting the driving motor to a source of electricity, and the driving motor is switched off when said sliding frame is moved to an inoperative condition in response to the stop of the rotation of the reel driving shaft.

13. The mechanism according to claim 10 wherein a guide pin provided for said elevating platform is received in a vertical guide groove of said sliding frame and an inclined guide groove provided for said stationary deck, and said shaft is received by a guide member provided for said elevating platform for guiding the vertical movement thereof.

14. The mechanism according to claim 10 which further comprises:

a superposed pinch roller supporting frame and head mounting plate which are pivotally mounted on said sliding frame by the same pivot shaft, a spring means for urging a head supported by said head mounting plate and a pinch roller supported by said pinch roller supporting plate against a tape, and means for positioning said pinch roller supporting frame and said head mounting plate, the movement of which is regulated by a cam of said sliding frame and a slot of said stationary deck, and wherein said head and said pinch roller are released from the engagement with the tape when the sliding frame is moved in response to the movement of said detection arm.

15. The mechanism according to claim 14, wherein said head mounting plate is provided with a cam slot and said pinch roller supporting frame is formed with a cam surface and said means engages said cam slot and said cam surface for operating said superposed pinch roller supporting plate and said head mounting plate.

16. The mechanism according to claim 14 wherein said pinch roller supporting frame comprises an arm extending from one side thereof for engaging a upright side wall of said head mounting plate, and said spring means is connected between said arm and said stationary deck.

17. The mechanism according to claim 14 which further comprises:
a high speed running control member for establishing the high speed running condition of the tape, and
a high speed running locking plate for locking said member in its operating position,
and wherein said plate is arranged to be operated by the end of said head mounting plate which is moved in response to the movement of said detection arm, thereby releasing the high speed running condition of the tape when the rotation of the reel driving shaft is stopped.

18. The tape running mechanism according to claim 17 which further comprises a driving motor, a motion transmission system for transmitting the rotation of said driving motor to a flywheel, said motion transmission system including first intermediate rotary member for running a tape at a normal speed, and a second intermediate rotary member for running the tape at a higher speed, an idler plate slidably mounted on an elevating platform for cooperating with said rotary members, a high speed running control member mounted on said stationary deck for operating said idler plate, an arm connected to said high speed running control member through spring means for operating said idler plate, and a vertical cam provided for said arm for maintaining engagement between said arm and said idler plate irrespective of the vertical movement of said elevating platform.

19. The tape running mechanism according to claim 17 which further comprises an ejecting member for releasing said elevating platform from a reproducing position, and a projection mounted on said ejecting member for cooperating with a remaining arm provided on said high speed running locking member.

20. The tape running mechanism according to claim 17 which further comprises an ejecting member, a guide frame mounted on said stationary deck for receiving a tape pack and for slidably supporting said ejecting member, an ejection link mounted on said stationary deck to be engaged by said ejecting member, and a high speed running locking member pivotally mounted on said stationary deck to be engaged by said ejecting member.

21. The tape running mechanism according to claim 17 which further comprises a leaf spring secured to said stationary deck and wherein said elevating platform is provided with means for receiving the free end of said leaf spring when said elevating platform is raised.

22. The tape running mechanism according to claim 21 wherein said leaf spring takes the form of a letter L with its free leg projected into the path of movement of said elevating platform and said means for receiving the free end of said leaf spring comprises a notch formed at one edge of said elevating platform.

* * * * *